(12) United States Patent
Boozer et al.

(10) Patent No.: US 10,172,496 B2
(45) Date of Patent: Jan. 8, 2019

(54) RETAINING ELEMENT (71) Applicant: VITA-MIX MANAGEMENT CORPORATION, Olmsted Township, OH (US)

(72) Inventors: Richard D. Boozer, Wakeman, OH (US); Andy Lamb, Northfield, OH (US)

(73) Assignee: Vita-Mix Management Corporation, Olmsted Township, OH (US)

( * ) Notice: Subject to any disclaimer, the term of this patent is extended or adjusted under 35 U.S.C. 154(b) by 807 days.

(21) Appl. No.: 14/549,715

(22) Filed: Nov. 21, 2014

(65) Prior Publication Data

US 2016/0143483 A1 May 26, 2016

(51) Int. Cl.
*A47J 43/046* (2006.01)
*F16B 39/28* (2006.01)

(52) U.S. Cl.
CPC .............. *A47J 43/046* (2013.01); *F16B 39/28* (2013.01)

(58) Field of Classification Search
CPC .................................................. A47J 43/046
USPC .................... 366/205, 314; 241/282.1, 282.2
See application file for complete search history.

(56) References Cited

U.S. PATENT DOCUMENTS

| 2005/0099884 A1* | 5/2005 | Lee ..................... A47J 43/0722 366/205 |
| 2010/0208548 A1* | 8/2010 | Hemelgarn ......... A47J 43/0727 366/198 |
| 2013/0264405 A1* | 10/2013 | Audette .............. A47J 43/0722 241/277 |

* cited by examiner

*Primary Examiner* — David L Sorkin
(74) *Attorney, Agent, or Firm* — McDonald Hopkins LLC (57) ABSTRACT

A retaining element is provided for coupling a blade assembly to a container of a blender apparatus that includes a main body portion, an overmolded portion, and a threaded portion for threadably coupling the blade assembly to the retaining element about a rotational axis to couple the blade assembly to the container. The retaining element further includes an optional locking projection configured to inhibit rotation of the retaining element about the rotational axis when the blade assembly is coupled to the container by way of the retaining element. The overmolded portion comprises the locking projection.

14 Claims, 6 Drawing Sheets

RETAINING ELEMENT

FIELD

The present disclosure relates generally to a retaining element, and more particularly, to a retaining element for coupling a blade assembly to a container of a blender apparatus.

BACKGROUND

Blenders are used to prepare food items by performing a chopping and/or mixing operation on food stuff. A blender can include a container for receiving food for blending and a blade assembly having blades that can be rotated to perform the blending operation on the food received in the container. The blade assembly can be removably coupled to the container such that the blades are located within the interior of the container and a drive shaft of the blade assembly extends through an aperture in the container. The blender can further include a base that the container may rest on that comprises a motor for rotating the drive shaft of the blade assembly. When an aperture is provided in a container of a blender for a drive shaft of a blade assembly to extend therethrough, it is possible that food or liquid within the container can leak through the aperture.

SUMMARY

The following presents a simplified summary of the disclosure in order to provide a basic understanding of some example aspects described in the detailed description.

In a first aspect, a retaining element for coupling a blade assembly to a container of a blender comprises a main body portion, an overmolded portion, and a threaded portion for threadably coupling the blade assembly to the retaining element about a rotational axis to couple the blade assembly to the container. The retaining element further comprises a locking projection configured to inhibit rotation of the retaining element about the rotational axis when the blade assembly is coupled to the container with the retaining element. The overmolded portion comprises the locking projection.

In one example of the first aspect, the main body portion comprises steel and the overmolded portion comprises an elastic polymer.

In another example of the first aspect, the overmolded portion comprises a seal portion configured to provide a seal between the retaining element and the container when the blade assembly is coupled to the container with the retaining element and the retaining element is rotated in a tightening direction.

In yet another example of the first aspect, the container comprises a rib portion and the locking projection is configured such that when the blade assembly is coupled to the container with the retaining element, the locking projection is engageable with the rib portion to inhibit rotation of the retaining element about the rotational axis.

In still yet another example of the first aspect, the retaining element further comprises a radial surface and the locking projection extends from a plane that the radial surface extends across.

In another example of the first aspect, the locking projection is configured to provide greater resistance to rotation of the retaining element in a loosening direction than in a tightening direction of rotation. In one example, the locking projection may comprise a vertical surface and a sloped surface that is non-vertical and non-horizontal, wherein the rotational axis defines a vertical direction. In another example, the container may comprise a rib portion and the vertical surface and sloped surface may be configured such that when the blade assembly is coupled to the container with the retaining element and the retainer element is rotated in the tightening direction, the rib portion will engage the sloped surface and then pass over the vertical surface. In yet another example, the vertical surface and sloped surface may be configured such that when the blade assembly is coupled to the container with the retaining element and the retaining element is rotated in the loosening direction, the rib portion will engage the vertical surface and then pass over the sloped surface.

In yet another example of the first aspect, the retaining element further comprises a plurality of locking projections configured to inhibit rotation of the retaining element about the rotational axis when the blade assembly is coupled to the container with the retaining element. In one example, the container comprises a plurality of rib portions and the plurality of locking projections are circumferentially spaced about the rotational axis such that when the blade assembly is coupled to the container with the retaining element, a subset of the plurality of locking projections will engage the plurality of rib portions simultaneously as the retaining element is rotated about the rotational axis. In another example, the plurality of locking projections may be circumferentially spaced about the rotational axis such that when the blade assembly is coupled to the container with the retaining element, at least one of the plurality of locking projections will engage one of the plurality of rib portions as the retaining element is rotated in increments of 7.5°.

The first aspect may be provided alone or in combination with any one or more of the examples of the first aspect discussed above.

In a second aspect, a blender comprises a container for receiving food for blending, a blade assembly, and a retaining element threadably coupled to the blade assembly, thereby coupling the blade assembly to the container. The retainer element comprises a main body portion and an overmolded portion. The retaining element is threadably coupled to the blade assembly about a rotational axis and the overmolded portion comprises a locking projection configured to inhibit rotation of the retaining element about the rotational axis.

In one example of the second aspect, the main body portion comprises steel and the overmolded portion comprises an elastic polymer.

In another example of the second aspect, the container comprises a rib portion and the locking projection is engageable with the rib portion to inhibit rotation of the retaining element about the rotational axis.

In yet another example of the second aspect, the locking projection is configured to provide greater resistance to rotation of the retaining element in a loosening direction than in a tightening direction of rotation. In one example, the locking projection may comprise a vertical surface and a sloped surface that is non-vertical and non-horizontal, wherein the rotational axis defines a vertical direction. In yet another example, the container may comprise a rib portion and the vertical surface and sloped surface are configured such that when the retainer element is rotated in the tightening direction, the rib portion will engage the sloped surface and then pass over the vertical surface.

In still yet another aspect of the second aspect, the container comprises a plurality of rib portions, the retaining element comprises a plurality of locking projections, and the plurality of locking projections are circumferentially spaced about the rotational axis such that when the blade assembly is coupled to the container with the retaining element, a limited number of the locking projections that is less than a total number of the locking projections will engage the plurality of rib portions simultaneously as the retaining element is rotated about the rotational axis. In one example, the plurality of locking projections may be circumferentially spaced about the rotational axis such that when the blade assembly is coupled to the container with the retaining element, at least one of the locking projections will engage one of the plurality of rib portions as the retaining element is rotated in increments of 7.5°.

The second aspect may be provided alone or in combination with any one or more of the examples of the second aspect discussed above.

In a third aspect, a retaining element for coupling a blade assembly to a container of a blender comprises a main body portion, an overmolded portion, and a threaded portion for threadably coupling the blade assembly to the retaining element about a rotational axis to couple the blade assembly to the container. The overmolded portion comprises a seal portion configured to provide a seal between the retaining element and the container when the blade assembly is coupled to the container with the retaining element and the retaining element is rotated in a tightening direction.

In one example of the third aspect, the retaining element further comprises a radial surface extending across a plane and the seal portion comprises two annular projections that extend from the plane and define an annular groove therebetween. In one example, the overmolded portion further comprises a locking projection configured to inhibit rotation of the retaining element about the rotational axis when the blade assembly is coupled to the container with the retaining element.

In still yet another example of the third aspect, the main body portion comprises steel and the overmolded portion comprises an elastic polymer.

The third aspect may be provided alone or in combination with any one or more of the examples of the third aspect discussed above.

BRIEF DESCRIPTION OF THE DRAWINGS

These and other features, aspects and advantages of the present disclosure are better understood when the following detailed description is read with reference to the accompanying drawings, in which.

DETAILED DESCRIPTION

Examples will now be described more fully hereinafter with reference to the accompanying drawings in which example embodiments are shown. Whenever possible, the same reference numerals are used throughout the drawings to refer to the same or like parts. However, this disclosure may be embodied in many different forms and should not be construed as limited to the embodiments set forth herein.

Figure 1:
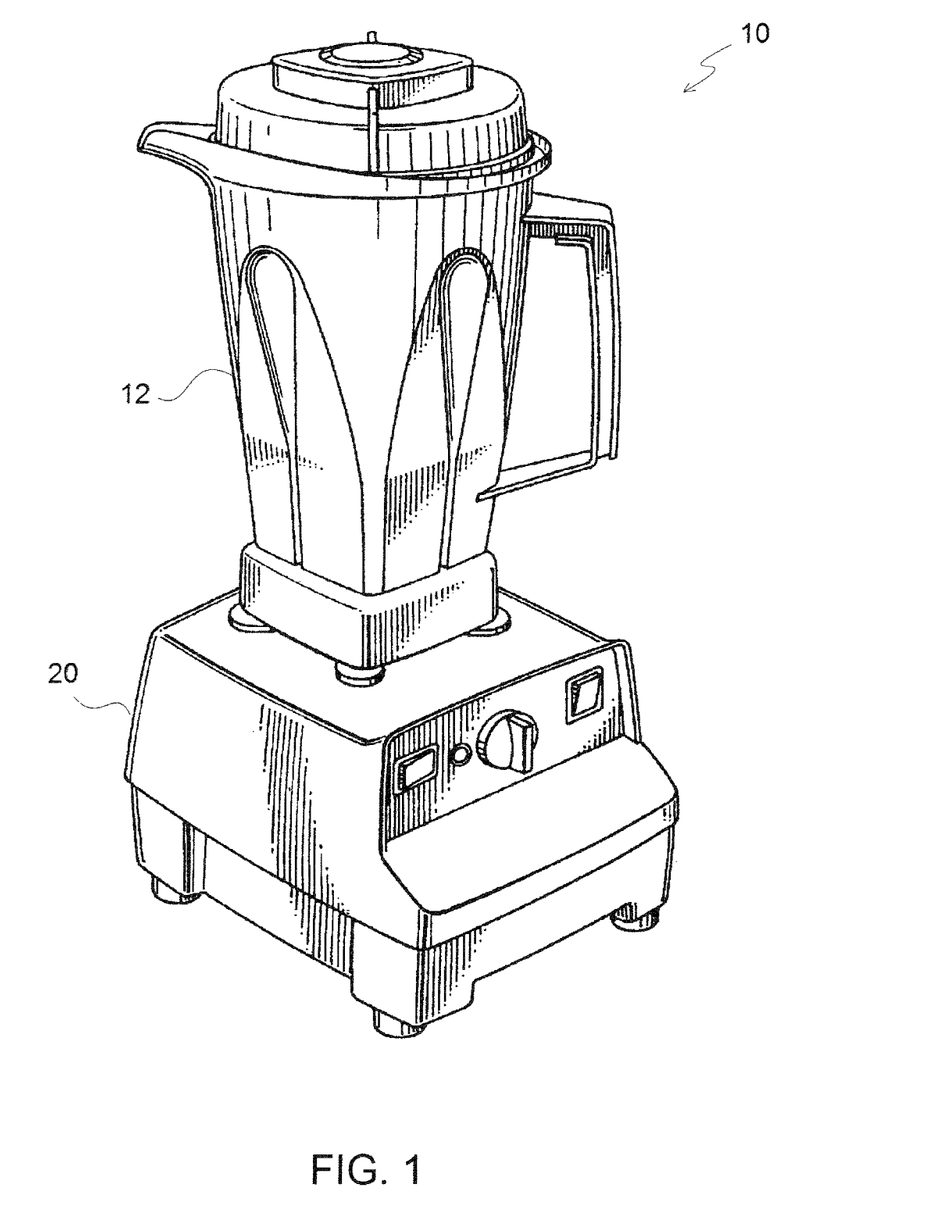
FIG. 1 is a perspective view of an exemplary blender apparatus.
Figure 2:
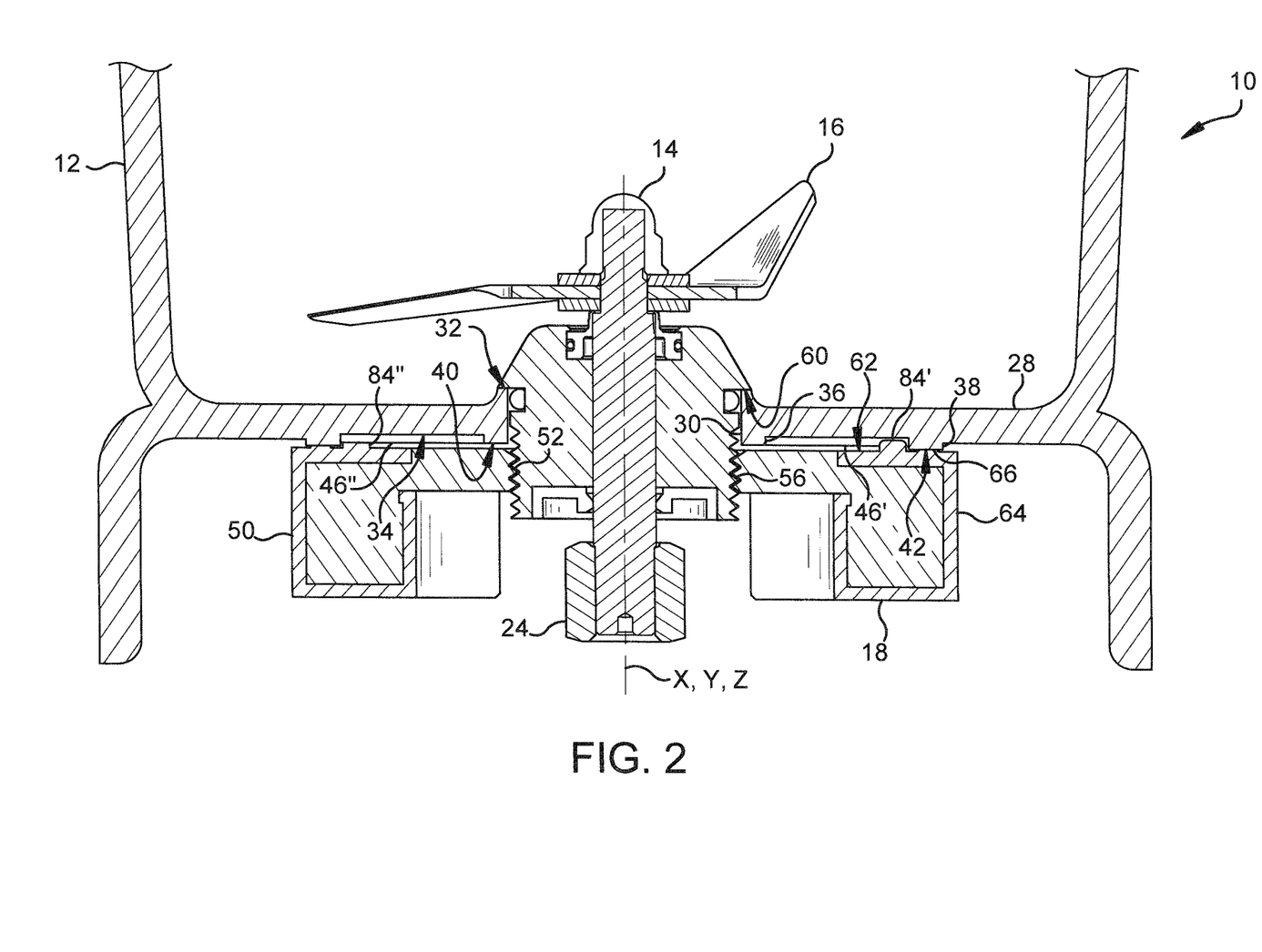
FIG. 2 is a cross-sectional view of a blade assembly portion of the exemplary blender apparatus.

Referring to FIGS. 1 and 2, an example blender apparatus 10 is shown that comprises a container 12 for receiving food for blending, a blade assembly 14 having blades 16 that can be rotated about an axis X of the blade assembly 14 to perform a blending operation on the food received in the container 12, and a retaining element 18 for coupling the blade assembly 14 to the container 12. It should be appreciated that food includes liquid and/or liquids. The container 12 can rest upon a base 20 having a motor that can be coupled to a drive shaft 24 of the blade assembly 14 and operated to rotate the drive shaft 24 and blades 16 of the blade assembly 14.

Figure 3:
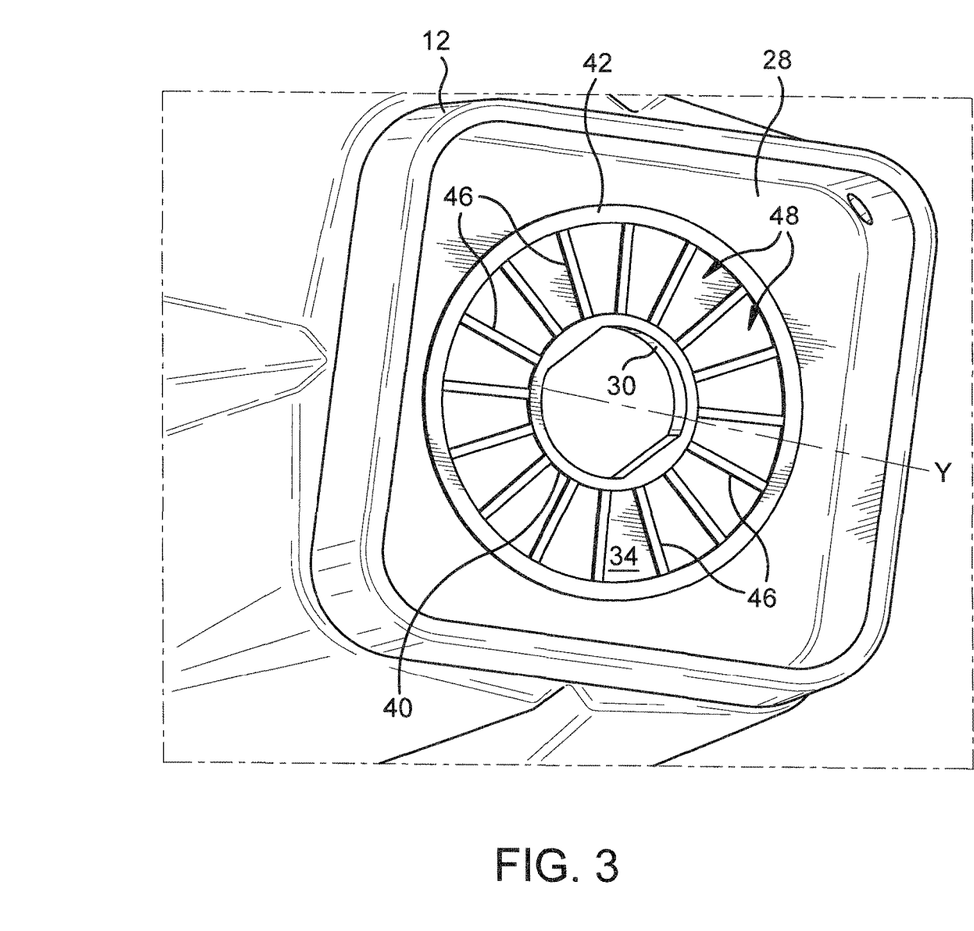
FIG. 3 is a perspective view of a container for the exemplary blender apparatus.

As shown in FIGS. 2 & 3, the container 12 can comprise a bottom wall portion 28 having an aperture 30 with an axis Y. The bottom wall portion 28 can further comprise an annular abutment surface 32, a bottom surface 34, and two annular surface portions 36, 38 that project from the bottom surface 34 and respectively comprise annular surfaces 40, 42. The annular abutment surface 32, bottom surface 34, two annular surface portions 36, 38, and annular surfaces 40, 42 can all be coaxial with the aperture 30. Moreover, the annular abutment surface 32, bottom surface 34, and annular surfaces 40, 42 can all be perpendicular to the axis Y, though they may alternatively be non-perpendicular in other examples.

The container 12 can further comprise a plurality of rib portions 46 that project from the bottom surface 34 and extend radially with respect to the axis Y from the annular surface portion 36 to the annular surface portion 38. The plurality of rib portions 46 can be circumferentially spaced about the axis Y, thus forming a plurality of recesses 48 defined by the plurality of rib portions 46 and the two annular surface portions 36, 38. The plurality of rib portions 46 can be circumferentially spaced in regular or irregular intervals about the axis Y. Although the plurality of rib portions 46 in the present example extend radially from the annular surface portion 36 to the annular surface portion 38, the plurality of rib portions 46 in other examples may extend in non-radial directions and/or the plurality of rib portions 46 may extend beyond annular surface portion 38 or only partially between the two annular surface portions 36, 38. The plurality of rib portions 46 may extend in a variety of directions and be spaced at various distances from each other.

Figure 4:
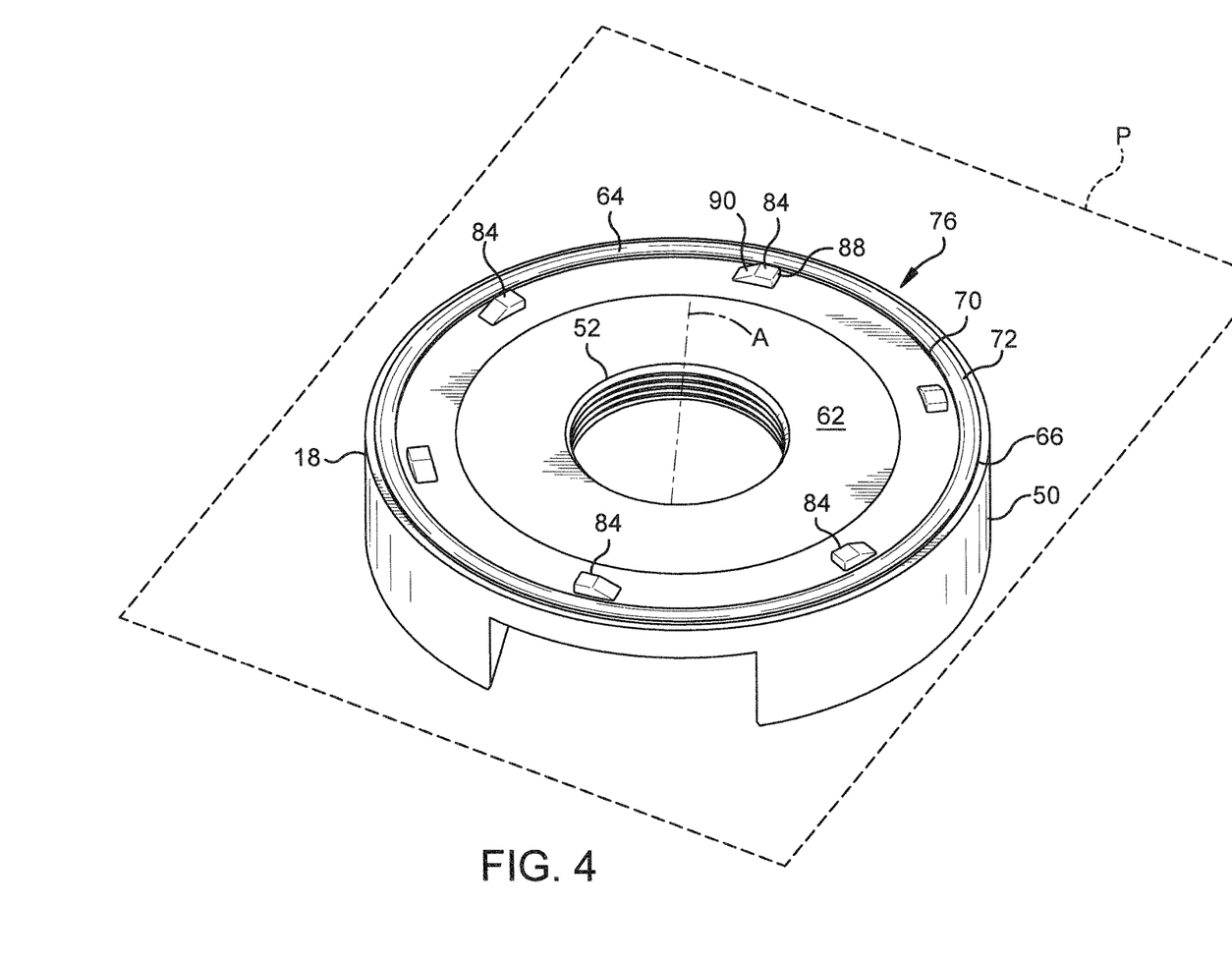
FIG. 4 is a perspective view of an overmolded retainer element for the exemplary blender apparatus.
Figure 5:
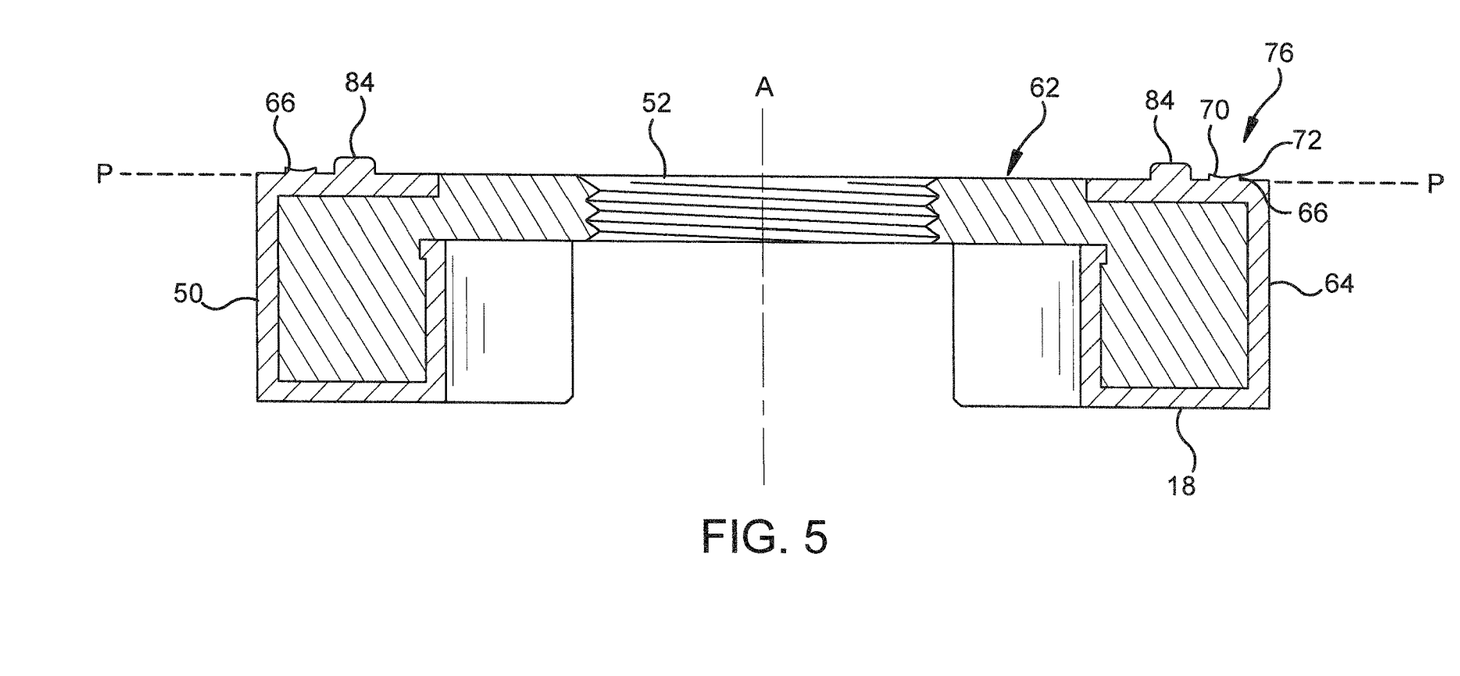
FIG. 5 is a cross-sectional view of the retainer element for the exemplary blender apparatus.

As shown in FIGS. 2, 4 & 5, the retaining element 18 can comprise a main body portion 50 and a threaded portion 52 having a rotational axis Z for threadably coupling the blade assembly 14 to the retaining element 18 about the rotational axis Z that permits connecting the blade assembly 14 to the container 12. In the present example, the threaded portion 52 is a threaded aperture that extends through the main body portion 50 and is configured to threadably receive a threaded portion 56 of the blade assembly 14. The container 12, blade assembly 14, and the retaining element 18 can be arranged such that the axis X, Y, and Z are coaxial and the bottom wall portion 28 of the container 12 is between an annular abutment surface 60 of the blade assembly 14 and a radial surface 62 of the retaining element 18. The threaded portion 56 of the blade assembly 14 may then be inserted into the threaded portion 52 of the retaining element 18 and the retaining element 18 may be rotated about its rotational axis Z relative to the blade assembly 14 to engage the threads of the blade assembly 14 and the retaining element 18 and thus couple the blade assembly 14 and the retaining element 18 together. Since the annular abutment surface 60 of the blade assembly 14 and the retaining element 18 have outer diameters greater than a diameter of the aperture 30 in the container 12, the blade assembly 14 will consequently be coupled to the container 12.

Although the retaining element 18 is threadably coupled to the blade assembly 14 in the present example by inserting the threaded portion 56 of the blade assembly 14 into the threaded portion 52 of the retaining element 18, the retaining element in other embodiments may comprise a threaded stud that is inserted into a threaded bore of the blade assembly 14 to similarly couple the blade assembly 14 and the retaining element 18 together. The threaded stud in such embodiments may have an aperture that permits the drive shaft 24 of the blade assembly 14 to extend therethrough and engage with the motor on the opposite side.

Once the blade assembly 14 is coupled to the container 12 with the retaining element 18 as described above, the retaining element 18 may be further rotated relative to the blade assembly 14 in a tightening direction about its rotational axis Z to provide a seal between the retaining element 18 and the container 12. The retaining element 18 comprises an overmolded portion 64 that includes an annular seal portion 66 that is configured to engage the annular surface 42 of the container 12 as the retaining element 18 is rotated in the tightening direction. Specifically, the annular seal portion 66 comprises two annular projections 70, 72 that are coaxial with the axis Z and extend from a plane P that the radial surface 62 of the retaining element 18 extends across, defining an annular groove 76 therebetween. As the retaining element 18 is rotated relative to the blade assembly 14 in a tightening direction about its rotational axis Z, a distance between the annular abutment surface 60 of the blade assembly 14 and the radial surface 62 of the retaining element 18 will decrease. The container 12, blade assembly 14, and retaining element 18 are configured such that eventually, the annular abutment surface 60 of the blade assembly 14 will press against the annular abutment surface 32 of the container 12 and the annular seal portion 66 of the retaining element 18 will press against the annular surface 42 of the container 12 (as shown in FIG. 2), thus forming a seal between the annular seal portion 66 of the retaining element 18 and the annular surface 42 of the container 12. The annular seal portion 66 also can act as a bumper between the retaining element 18 and the container 12 to prevent other portions of the retaining element 18 from colliding with the container 12 as retaining element 18 and container 12 vibrate during operation of the drive shaft 24 by the motor.

To assist in maintaining a proper sealing pressure between the annular seal portion 66 of the retaining element 18 and the annular surface 42 of the container 12, the overmolded portion 64 of the retaining element 18 may comprise a plurality of locking projections 84 configured to inhibit rotation of the retaining element 18 relative to the container 12 about the rotational axis Z when the blade assembly 14 is coupled to the container 12 with the retaining element 18. Each locking projection 84 can extend from the plane P that the radial surface 62 of the retaining element 18 extends across. Moreover, the plurality of locking projections 84 may be circumferentially spaced in regular intervals about the rotational axis Z (as shown in FIG. 4) or the plurality of locking projections 84 may be circumferentially spaced in irregular intervals about the rotational axis Z. Once the blade assembly 14 is coupled to the container 12 with the retaining element 18, the retaining element 18 can be further rotated relative to the blade assembly 14 as discussed above to cause the distance between the annular abutment surface 60 of the blade assembly 14 and the radial surface 62 of the retaining element 18 to decrease. The container 12, blade assembly 14, and retaining element 18 are configured such that eventually, the plurality of locking projections 84 will engage and interfere with the plurality of rib portions 46 of the container 12 as the retaining element 18 is being rotated about its axis Z.

For example, as can be seen in FIG. 2, further rotation of the retaining element 18 from its illustrated position in the tightening direction relative to the blade assembly 14 and the container 12 would cause the locking projection 84a to engage and interfere with the rib portion 46a. Similarly, rotation of the retaining element 18 from its illustrated position in the loosening direction relative to the blade assembly 14 and the container 12 would cause the locking projection 84b to engage and interfere with the rib portion 46b. In this manner, the locking projections 84a, 84b and rib portions 46a, 46b will inhibit rotation of the retaining element 18 in either direction relative to the blade assembly 14 and the container 12. Preferably, however, each locking projection 84 comprises a flexible material such that each locking projection 84 will deflect under pressure by the rib portions 46 when sufficient torque is applied to the retaining element 18. As such, sufficient torque may be applied to rotate the retaining element 18 in the tightening direction until a proper sealing pressure is present between the retaining element 18 and the container 12 and the plurality of locking projections 84 and rib portions 46 will inhibit rotation of the retaining element 18 in the loosening direction, thus assisting in maintenance of the sealing pressure. However, when it is desired to decouple the blade assembly 14 from the container 12 to, for example, clean the blade assembly 14, sufficient torque may be applied to rotate the retaining element 18 in the loosening direction until the retaining element 18 is decoupled from the blade assembly 14.

The plurality of locking projections 84 may comprise any shape that extends from the plane P that the radial surface 62 of the retaining element 18 extends across. For example, the plurality of locking projections 84 may comprise a cube shape or a hemispherical shape that extends from the plane P. The shapes of the locking projections 84 in the present example are configured to provide greater resistance to rotation of the retaining element 18 in the loosening direction than in the tightening direction. Specifically, each locking projection 84 comprises a vertical surface 88 and a sloped surface 90 that is non-vertical and non-horizontal, wherein the axis Z of the retaining element 18 defines the vertical direction. The vertical and sloped surfaces 88, 90 are configured such that when the blade assembly 14 is coupled to the container 12 with the retaining element 18 and the retainer element 18 is rotated in the tightening direction, the rib portions 46 will engage the sloped surfaces 90 of the locking projections 84 and then pass over their vertical surfaces 88. Meanwhile, when the blade assembly 14 is coupled to the container 12 with the retaining element 18 and the retainer element 18 is rotated in the loosening direction, the rib portions 46 engage the vertical surfaces 88 of the locking projections 84 and then pass over their sloped surfaces 90. Since engagement with the vertical surfaces 88 provides greater resistance than engagement with the sloped surfaces 90, the locking projections 84 provide greater resistance to rotation of the retaining element 18 in the loosening direction than in the tightening direction. Accordingly, the locking projections 84 can provide sufficient resistance to help maintain a proper sealing pressure between the retaining element 18 and the container 12 while still permitting the retaining element 18 to be easily tightened.

The container 12 and retaining element 18 in the present example respectively comprise sixteen rib portions 46 and six locking projections 84. However, the container 12 and retaining element 18 in some examples may comprise only one rib portion 46 and/or locking projection 84. Indeed, the container 12 and retaining element 18 in other examples may comprise any number of rib portions 46 and locking projections 84. The number of rib portions 46 and locking projections 84 can impact how far the retaining element 18 can rotate before resistance is applied by the rib portions 46 and locking projections 84. For example, if a blender apparatus in one embodiment comprises a container 12 and retaining element 18 that respectively include two rib portions 46 and two locking projections 84 that are circumferentially spaced 180° apart from each other, the retaining element 18 will at most have to rotate 180° before resistance is applied by the rib portions 46 and locking projections 84. As another example, if a blender apparatus in another embodiment comprises a container 12 and retaining element 18 that respectively include four rib portions 46 and four locking projections 84 that are circumferentially spaced 90° apart from each other, the retaining element 18 will at most have to rotate 90° before resistance is applied by the rib portions 46 and locking projections 84. Thus, the number of rib portions 46 and locking projections 84 can be designed to achieve a desired maximum rotation before resistance is applied by the rib portions 46 and locking projections 84. Of course, as more locking projections 84 are added to the retaining element 18, the resistance applied by the locking projections 84 will increase if they are configured to engage the rib portions 46 simultaneously.

The rib portions 46 and locking projections 84 of the blender apparatus 10 described above can assist in maintaining a proper sealing pressure between the retaining element 18 and the container 12. Moreover, since the retaining element 18 comprises a main body portion 50 and a separate overmolded portion 64 that includes the plurality of locking projections 84 and the annular seal portion 66, the main body portion 50 and the overmolded portion 64 can comprise different materials. For example, the main body portion 50 can comprise a strong material such as steel while the overmolded portion 64 can comprise an elastic polymer such as rubber. A material such as steel for the main body portion 50 can provide strong, durable threads on the threaded portion 52 that can withstand higher axial forces needed to provide a tighter seal between the retaining element 18 and the container 12. Moreover, a material such as rubber for the overmolded portion 64 is advantageous as it can offer good seal and bumper characteristics for the annular seal portion 66 and it can allow the locking projections 84 to deflect easier when they engage the rib portions 46 of the container 12 during rotation of the retaining element 18. Proper deflection of the locking projections 84 is especially advantageous when the container 12 comprises a material such as glass that can be damaged if a less flexible material is pressed against it. Thus, the separate nature of the main body portion 50 and the overmolded portion 64 can provide multiple advantages. However, there may be embodiments wherein the main body portion 50 and the overmolded portion 64 are integrated as a single unit. Alternatively, there may be embodiments wherein the main body portion 50 and the overmolded portion 64 are separate but the overmolded portion 64 does not comprise both the plurality of locking projections 84 and the annular seal portion 66. For instance, the annular seal portion 66 may be a separate component provide by a gasket or O-ring. As another example, the locking projections 84 may be formed by the main body portion 50.

Figure 6:
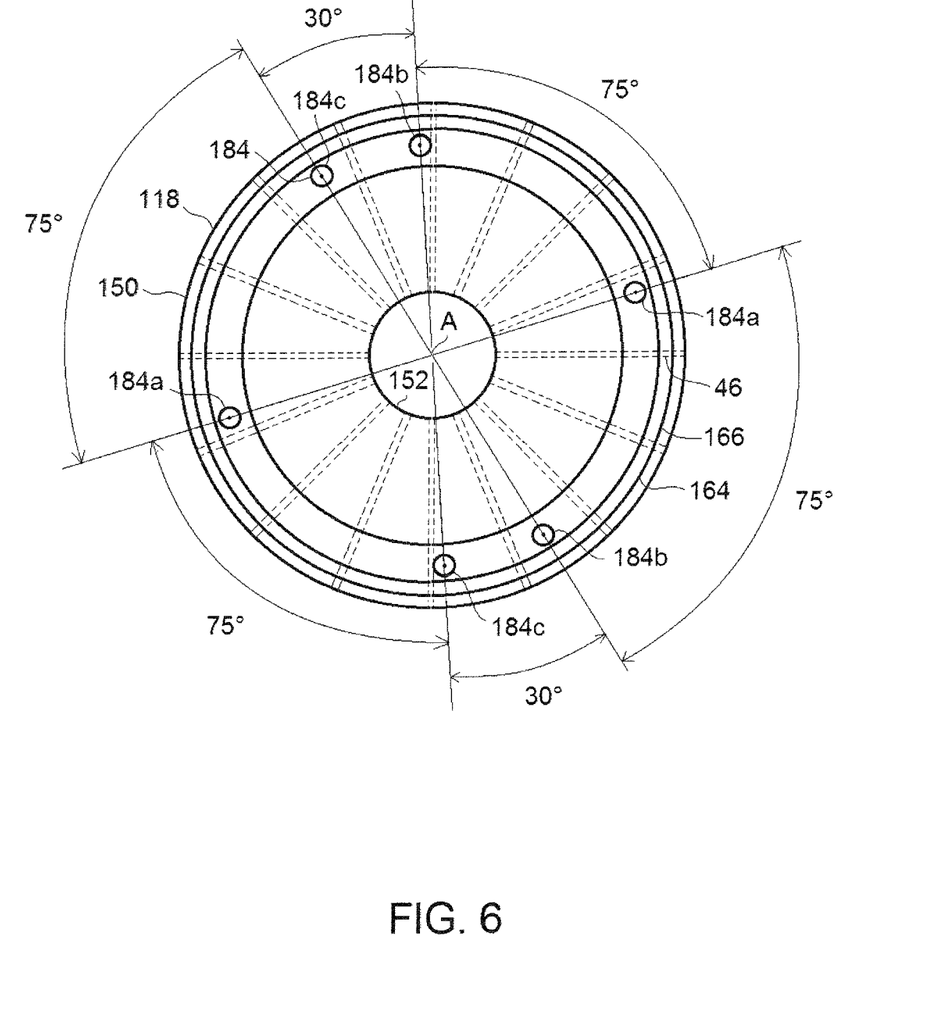
FIG. 6 is a top view of another retainer element for the exemplary blender apparatus.

Turning now to FIG. 6, an example retaining element 118 is illustrated that may be used in place of the retaining element 18 described above. The retaining element 118 is similar to the retaining element 18 in many respects. For example, the retaining element 118 comprises a main body portion 150 and a threaded portion 152 having a rotational axis A for threadably coupling the blade assembly 14 to the retaining element 18 about the rotational axis A to permit coupling the blade assembly 14 to the container 12. FIG. 6 shows in dashed lines the location of the plurality of rib portions 46 of the container 12 in relation to the retaining element 118 when the blade assembly 14 is coupled to the container 12 by way of the retaining element 118. Once the blade assembly 14 is coupled to the container 12 with the retaining element 118, the retaining element 118 may be further rotated relative to the blade assembly 14 in a tightening direction about its rotational axis A to provide a seal between the retaining element 18 and the container 12. The retaining element 118 comprises an overmolded portion 164 that includes an annular seal portion 166 that is configured to engage the annular surface 42 of the container 12 as the retaining element 18 is rotated in the tightening direction. As the retaining element 118 is rotated relative to the blade assembly 14 in a tightening direction about its rotational axis A, a distance between the annular abutment surface 60 of the blade assembly 14 and the radial surface 162 of the retaining element 18 will decrease. The container 12, blade assembly 14, and retaining element 118 are configured such that eventually, the annular abutment surface 60 of the blade assembly 14 will press against the annular abutment surface 32 of the container 12 and the annular seal portion 166 of the retaining element 118 will press against the annular surface 42 of the container 12, thus forming a seal between the annular seal portion 166 of the retaining element 118 and the annular surface 42 of the container 12.

To assist in maintaining a proper sealing pressure between the annular seal portion 166 of the retaining element 118 and the annular surface 42 of the container 12, the overmolded portion 164 of the retaining element 118 further comprises a plurality of locking projections 184 configured to inhibit rotation of the retaining element 118 relative to the container 12 about the rotational axis A when the blade assembly 14 is coupled to the container 12 with the retaining element 18. Each locking projection 184 can extend from the plane that the radial surface 162 of the retaining element 118 extends across. Once the blade assembly 14 is coupled to the container 12 with the retaining element 118, the retaining element 118 can be further rotated relative to the blade assembly 14 to cause the distance between the annular abutment surface 60 of the blade assembly 14 and the radial surface 162 of the retaining element 118 to decrease. The container 12, blade assembly 14, and retaining element 118 are configured such that eventually, the plurality of locking projections 184 will engage and interfere with the plurality of rib portions 46 of the container 12 as the retaining element 118 is being rotated about its axis A.

The main difference between the retaining element 118 and the retaining element 18 is that the plurality of locking projections 184 are hemispherical in shape and circumferentially spaced about the rotational axis A such that when the blade assembly 14 is coupled to the container 12 with the retaining element 118, a limited number or subset of the locking projections 184 (less than the total number of locking projections 184) engages the plurality of rib portions 46 simultaneously as the retaining element 118 is rotated about the rotational axis A. The limited number of the locking projections 184 may be one, two, or any other quantity of locking projections 184 that is less than the total number of locking projections 184.

In the present example, the plurality of locking projections 184 are circumferentially spaced irregularly about the rotational axis A such that a maximum of two of the locking projections 184 will engage the plurality of rib portions 46 simultaneously as the retaining element 118 is rotated about the rotational axis A. As shown in FIG. 6, the plurality of locking projections 184 comprises three sets of locking projections 184a, 184b, 184c. The locking projections 184a are spaced 75° from the locking projections 184b, which are spaced 30° from the locking projections 184c, which are spaced 75° from the locking projections 184a. Meanwhile, the sixteen rib portions 46 of the container 12 are equally spaced apart about the axis A by 22.5°. This means that whenever the locking projections 184a start to engage the rib portions 46 while the retaining element 118 is being rotated in the tightening direction (i.e. counter-clockwise in FIG. 6), the locking projections 184b will always be 7.5° off from engaging the rib portions 46 and the locking projections 184c will always be 15° off from engaging the rib portions 46. Similarly, whenever the locking projections 184b start to engage the rib portions 46 while the retaining element 118 is being rotated in the tightening direction, the locking projections 184c will always be 7.5° off from engaging the rib portions 46 and the locking projections 184c will have just passed the rib portions 46. Furthermore, whenever the locking projections 184c start to engage the rib portions 46 while the retaining element 118 is being rotated in the tightening direction, the locking projections 184a will always be 7.5° off from engaging the rib portions 46 and the locking projections 184b will have just passed the rib portions 46. The sets of locking projections 184a, 184b, 184c will operate similarly in the loosening direction (i.e. clockwise in FIG. 6) as well.

Because the locking projections 184 are spaced such that a limited number (e.g., a subset) of the locking projections 184 will engage the plurality of rib portions 46 simultaneously as the retaining element 118 is rotated, the locking projections 184 can provide less resistance to rotation of the retaining element 118 in the tightening direction than an embodiment of the retaining element wherein all of the locking projections 184 engage the rib portions 46 simultaneously. Moreover, an advantage to the irregular spacing of the locking projections 184 of the present example is that when the blade assembly 14 is coupled to the container 12 with the retaining element 118, at least one of the plurality of locking projections 184 will engage one of the plurality of rib portions 46 as the retaining element is rotated in increments of 7.5°. Indeed, if the six locking projections 184 were configured to be equally spaced about the axis A by 60°, the retaining element 118 would need to be rotated almost a full 22.5° after the locking projections 184 passed the rib portions 46 to engage with them again. Thus, the irregular configuration of the present embodiment permits the rotational position of the retaining element 118 to be adjusted in smaller increments.

Although the retaining element 118 in the present embodiment comprises six locking projections 184 irregularly spaced apart by the degrees shown in FIG. 6 so as to limit the number of locking projections 184 that engage the rib portion 46, the number and spacing of the locking projections 184 may vary in other embodiments to produce the same effect. Similarly, the number and spacing of the locking projections 184 may vary in other embodiments and still be configured such that when the blade assembly 14 is coupled to the container 12 with the retaining element 118, at least one of the plurality of locking projections 184 will engage one of the plurality of rib portions 46 as the retaining element is rotated in increments of 7.5°. The number and spacing of the locking projections 184 described above are only examples of variables that may be applied to achieve such results. Ultimately, the spacing of locking projections 184 provided will depend on the number of locking projections 184 provided as well as the number and spacing of the rib portions 46 of the container 12.

It will be apparent to those skilled in the art that various modifications and variations can be made to the present disclosure without departing from the spirit and scope of the invention. Thus, it is intended that the present invention cover the modifications and variations of this disclosure provided they come within the scope of the appended claims and their equivalents.

What is claimed is:

1. A retaining element for coupling a blade assembly to a container of a blender, the retaining element comprising:
   a radial surface operatively adjacent to the container;
   a main body portion;
   an overmolded portion;
   a threaded portion for threadably coupling the blade assembly to the retaining element about a rotational axis to couple the blade assembly to the container;
   at least one curved protrusion that extends from the main body in a first direction, and
   a locking projection extending from the radial surface in a second direction that is opposite the first direction, and configured to inhibit rotation of the retaining element about the rotational axis when the blade assembly is coupled to the container with the retaining element,
   wherein the overmolded portion comprises the locking projection, and
   wherein the locking projection operatively extends in a direction towards the container and opposite a splined coupler of the blade assembly.

2. The retaining element of claim 1, wherein the main body portion comprises steel and the overmolded portion comprises an elastic polymer.

3. The retaining element of claim 1, wherein the overmolded portion comprises a seal portion configured to provide a seal between the retaining element and the container when the blade assembly is coupled to the container with the retaining element and the retaining element is rotated in a tightening direction.

4. The retaining element of claim 1, wherein the locking projection is configured to engage a rib portion of a container when the blade assembly is coupled to the container with the retaining element.

5. The retaining element of claim 1, wherein the locking projection is configured to provide greater resistance to rotation of the retaining element in a loosening direction than in a tightening direction of rotation.

6. The retaining element of claim 5, wherein the locking projection comprises a vertical surface and a sloped surface that is non-vertical and non-horizontal, further wherein the rotational axis defines a vertical direction.

7. The retaining element of claim 6, wherein the container comprises a rib portion and the vertical surface and sloped surface are configured such that when the blade assembly is coupled to the container with the retaining element and the retainer element is rotated in the tightening direction, the rib portion will engage the sloped surface and then pass over the vertical surface.

8. The retaining element of claim 7, wherein the vertical surface and sloped surface are configured such that when the blade assembly is coupled to the container with the retaining element and the retaining element is rotated in the loosening direction, the rib portion will engage the vertical surface and then pass over the sloped surface.

9. The retaining element of claim 1, further comprising a plurality of locking projections configured to inhibit rotation of the retaining element about the rotational axis when the blade assembly is coupled to the container with the retaining element.

10. The retaining element of claim 9, wherein the container comprises a plurality of rib portions and the plurality of locking projections are circumferentially spaced about the rotational axis such that when the blade assembly is coupled to the container with the retaining element, a subset of the plurality of locking projections will engage the plurality of rib portions simultaneously as the retaining element is rotated about the rotational axis.

11. The retaining element of claim 10, wherein the plurality of locking projections are circumferentially spaced about the rotational axis such that when the blade assembly is coupled to the container with the retaining element, at least one of the plurality of locking projections will engage one of the plurality of rib portions as the retaining element is rotated in increments of 7.5°.

12. A retaining element for coupling a blade assembly to a container of a blender, the retaining element comprising:

a main body portion comprising a radial portion and at least one curved protrusion extending from the main body;

an overmolded portion overmolding the at least one curved protrusion of the main body; and a threaded portion for threadably coupling the blade assembly to the retaining element about a rotational axis to couple the blade assembly to the container, wherein the overmolded portion comprises a seal portion configured to provide a seal between the retaining element and the container when the blade assembly is coupled to the container with the retaining element and the retaining element is rotated in a tightening direction, wherein the at least one curved protrusion is disposed generally coaxial with a rotational axis of the blade assembly; and wherein the retaining element further comprises a radial surface extending across the radial portion of the main body and wherein the seal portion comprises two annular projections that extend from the radial surface and define an annular groove there between.

13. The retaining element of claim 12, wherein the overmolded portion further comprises a locking projection extending in a direction generally opposed to the at least one curved protrusion configured to inhibit rotation of the retaining element about the rotational axis when the blade assembly is coupled to the container with the retaining element.

14. The retaining element of claim 12, wherein the main body portion comprises steel and the overmolded portion comprises an elastic polymer.

* * * * *